Inventors
Joseph R. Oltieri
Robert H. Guba
Alvin W. Graf
Attorney

Inventors
Joseph R. Altieri
Robert F. Guba
Alois W. Graf Attorney

United States Patent Office 2,779,918
Patented Jan. 29, 1957

2,779,918
RESOLUTION TESTER

Joseph R. Altieri, Los Angeles, Calif., and Robert F. Guba, Acton, Mass., assignors to Acton Laboratories, Inc., Acton, Mass.

Application February 9, 1955, Serial No. 487,029

12 Claims. (Cl. 324—63)

This invention relates to voltage and displacement resolution testers for wound resistance elements, and more particularly such a tester in which these resolution characteristics are determined by a single integrated unit.

One of the characteristics of a wound resistance element which will affect its usefulness in continuous data systems is its resolution. The resolution of such an element can be expressed in two forms; namely voltage resolution and displacement resolution.

Voltage resolution may be expressed as a percentage and is then defined as the percent incremental voltage change as the potentiometer brush traverses the winding, referred to the total voltage impressed across the winding.

Displacement resolution as applied to wound resistance elements in which the potentiometer brush traverses linear, angular, or some other curvilinear path of motion, may be expressed as either an absolute or a relative percentage value. Absolute displacement resolution is defined as the incremental angle or stroke through which the brush must travel to produce a voltage change. Percentage resolution is defined as the percent incremental angle or stroke through which the brush must travel to produce a voltage change referred to the total angle or stroke of the resistance element.

One of the problems in testing potentiometers for displacement and voltage resolution is to have available a device which simply, quickly, and automatically will test a potentiometer for these characteristics and will indicate by aural and/or visual means whenever any portion of a potentiometer under test fails to meet the specifications as to displacement and voltage resolution imposed for that particular unit. Such a tester should test for these resolution characteristics of a potentiometer for as small a portion as two adjacent potentiometer turns, and should be able to test separately for either voltage or displacement resolution of a potentiometer as selected by the simple flip of a switch.

The present device meets these requirements in a combination resolution tester. It permits testing for displacement resolution by simply setting the permissible displacement between two points on a potentiometer winding by means of a dial, whereupon a gate will be triggered with resulting aural and/or visual indication if the spacing between such two points is too large as the various points along the winding are sequentially tested throughout the potentiometer winding. Simply throwing a switch from its displacement resolution to its voltage resolution position registers a similar indication for voltage resolution whenever the amplitude of a step pulse produced as the potentiometer winding turns are sequentially tested exceeds a maximum permissible voltage change, which maximum change can be adjusted by setting the voltage applied across the potentiometer winding.

Accordingly, it is an object of this invention to provide a new and improved combination voltage and displacement resolution tester for wound resistance elements.

Another object of this invention is to provide an improved combination voltage and resolution tester which simply, quickly and automatically will test a potentiometer for resolution and will indicate by aural and visual means whenever any portion of a potentiometer under test fails to meet the specifications as to resolution.

Another object of this invention is to provide an improved resolution tester that will test separately for either voltage or resolution of a potentiometer as selected by the simple change of a switch.

Still another object of this invention is to provide a new combination voltage and resolution tester which utilizes a minimum number of circuits while at the same time providing for maximum use of the same circuit in testing for voltage and resolution.

Other objects and advantages of the invention will be apparent during the course of the following description when read in connection with the accompanying drawings wherein like numerals designate like structural components, and:

Figure 1:
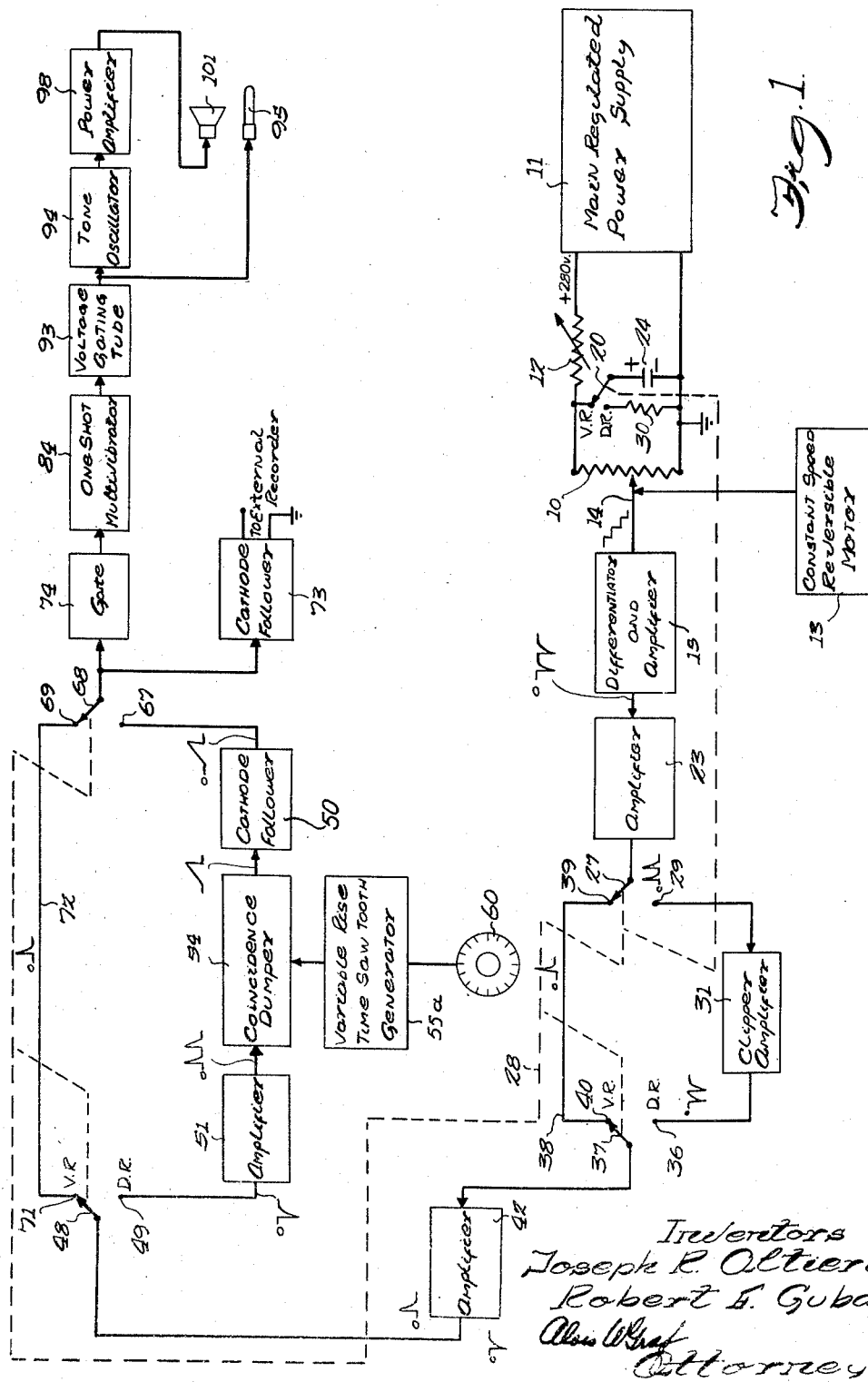
Figure 1 is a block diagram of the combined resolution tester.
Figure 2:
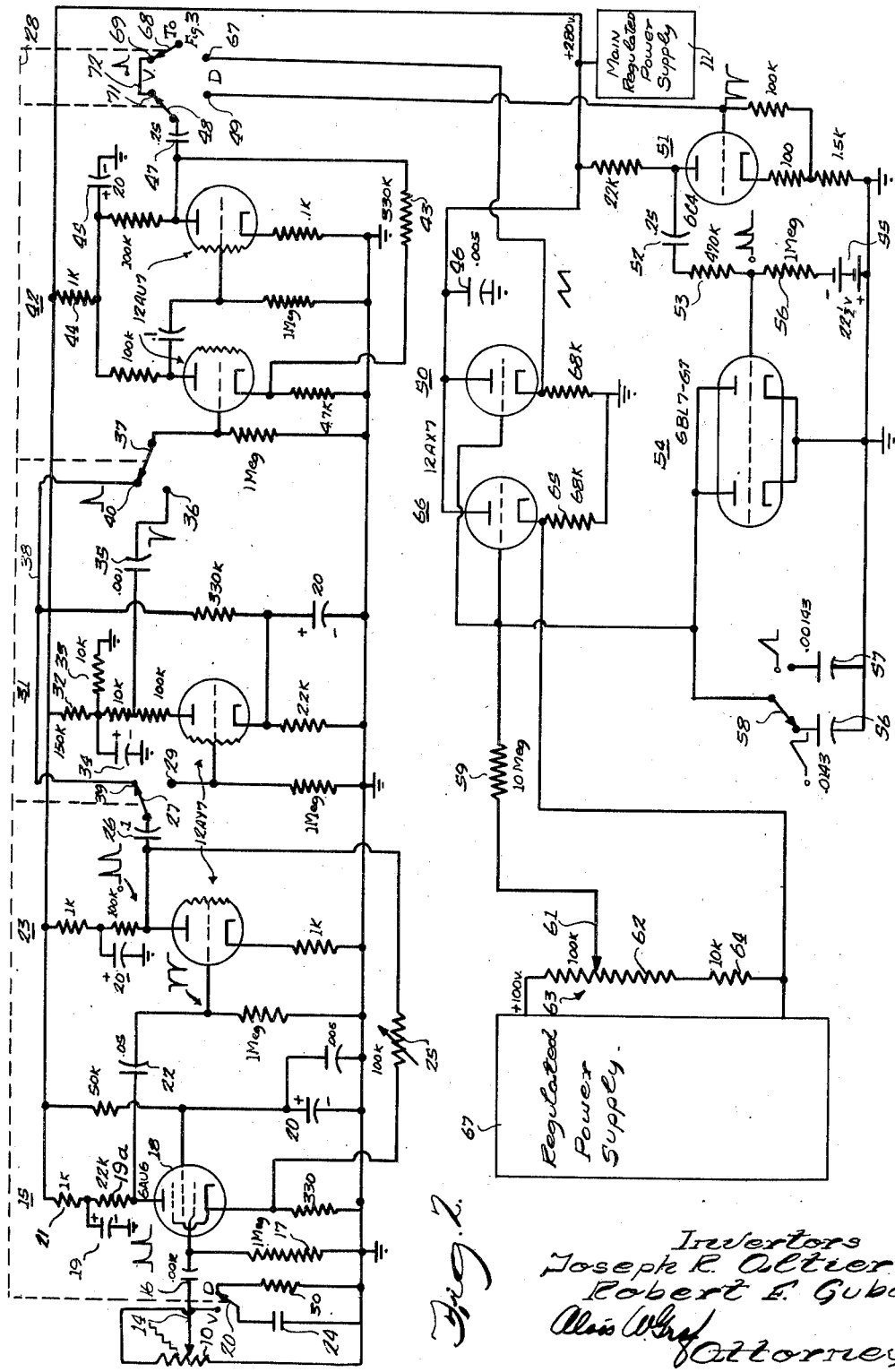
Figure 2 is a schematic diagram of the wiring of part of the circuit of the combined resolution tester.

Referring now more particularly to Figures 1 and 2, there is shown a potentiometer 10 which is to be tested for its displacement and voltage resolution in the present device. A well regulated power supply 11, which in a representative embodiment has an output voltage of 280 volts, is connected in series with a variable calibration resistor 12 across the potentiometer 10. A constant speed reversible motor 13 drives a wiper pickup arm 14 along the surface of the potentiometer winding 10 in a direction approximately at right angles to the individual winding turns. In the embodiment the motor 13 is a 1 R. P. M. motor. The voltage picked up by the wiper 14 is fed into a differentiator-amplifier 15.

A pole 20 of a five pole double-throw switch 28 is connected across the potentiometer 10 when the double-throw switch 28 is in its "Voltage resolution" position. This connects a capacitor 24 across the potentiometer 10 when testing for voltage resolution to present a low impedance, constant voltage excitation source which simulates usual potentiometer operating conditions. With the switch 28 in its "Displacement resolution" position, the capacitor 24 is discharged through a resistor 30 to ground and is not used during this test.

The wiper voltage is differentiated in the stage 15 by a capacitor 16 and a resistor 17 which are connected in series from the wiper arm input to ground and whose common connection is fed to the grid input of an amplifier tube 18 which is of standard design. A capacitor 19 and a resistor 19a connected in the plate circuit of the amplifier tube 18 form a decoupling network, as is well known in the pulse art. The output from the differentiator-amplifier 15 is fed through a capacitor 22 to the grid of a triode amplifier stage 23 which provides negative feedback from its plate through an adjustable resistor 25 to the cathode of the amplifier tube 18. Resistor 25 is adjusted to control the gain of stages 15 and 23. Decoupling from the plate supply voltage is provided for this stage in the same manner as for stage 15.

The output of the amplifier stage 23 is fed through a capacitor 26 to a selector pole 27 of the five pole double-throw switch 28. In the displacement resolution position of the switch 28, the selector pole 27 is connected through a contact 29 to the grid of a clipper-amplifier stage 31. The clipper-amplifier stage 31 consists of a triode tube operated normally below cut-off and having a very low plate supply voltage. The tube operated in this manner will base clip and then peak clip the pulses producing constant amplitude pulses at its output. This circuit is particularly necessary when testing a non-linear function, since the voltage steps can vary as much as 4-to-1 using the same wire and turn spacing.

It should be noted that the plate voltage for this tube is provided at the juncture of a voltage divider consisting of two resistors 32 and 33 between B-plus and ground. A capacitor 34 serves decoupling purposes. The output of the clipper-amplifier 31 is fed through a capacitor 35 to a first contact 36 of a selector pole 37 which is one of the five selector poles of the switch 28. A conductor 38 connects the contacts 39 and 40 of the selector poles 27 and 37, respectively. This lead by-passes the clipper amplifier stage 31 when the switch 28 is in its voltage resolution position. The selector pole 37 is connected to the control grid of the front of a two stage capacity-coupled amplifier circuit 42 which provides negative feedback from the second stage through a resistor 43 to the first stage, and is decoupled from the plate supply by a resistor 44 by-passed by a capacitor 45. The output of the two-stage amplifier circuit 42 is coupled through a capacitor 47 to a selector pole 48 of the switch 28. In its displacement resolution position, the selector pole 48 is connected through a contact 49 to an amplifier stage 51. The pulse output of the amplifier 51 is coupled through a capacitor 52 and a resistor 53 to the grid of a dual triode dumper tube 54 having its sections connected in parallel. The grids of the dumper tube are normally maintained below cut-off by a negative voltage source such as a battery 55 connected between ground and through a resistor 56 to the grid of the dumper tube. The internal impedance of the voltage source 55 and the resistor 56 also provide the D. C. ground return for the grids of the dumper tube. The output of a variable rise time saw tooth generator 55A having an unusually linear voltage rise is applied to the plate of the dumper tube 54 and the grid of a cathode follower stage 50.

Turning now to the operation of the variable rise time saw tooth generator 55A, a constant current flows through the circuit loop consisting of one of the capacitors 56 or 57, depending on which is selected by the single pole two-position switch 58, resistor 59, potentiometer arm 61, a portion 62 of potentiometer winding 63, resistor 64 and resistor 65 which is positioned between cathode and ground of a cathode follower stage 66. The resistor 59 has a much larger resistance than the resistor 65. The plate voltage for the cathode follower stages 50 and 66 of 280 volts is provided by the main regulated power supply 11. The plates of cathode follower stages 50 and 66 are by-passed to ground by a capacitor 46. A considerably smaller voltage is provided by a well regulated power supply 67 across the series connected potentiometer 63 and the resistor 64. The voltage between the potentiometer arm 61 and the end of resistor 64, remote from the potentiometer winding 63, may vary approximately between 10 and 100 volts. As a result, the constant current flowing through the just recited loop is very much smaller than the current flowing between cathode and plate of the cathode follower stage 66.

Recalling basic cathode follower theory in connection with the constant current loop circuit and cathode follower stage 66, it is seen that the product of the plate current through cathode follower stage 66 and the cathode resistor 65 is practically equal to one over the capacitance of capacitor 56 or capacitor 57, whichever is inserted in the loop circuit by selector switch 58, times the integral $i_c dt$, where $i_c$ is the constant loop current. Since the resistor 59 is much larger in value than the resistor 65, the term provided by the product of the constant loop current and the cathode resistor 65 may be neglected in the cathode follower equation. As a result, the loop current is solely a function of the voltage between the wiper arm 61, the end of the resistor 64 remote from this wiper arm, and the resistor 59. Since both of these are constant, the applied voltage being selected by the position of the wiper arm 61, the current flowing in the previously recited loop is a constant, and the voltage rise is linear across the capacitor 56 or 57, whichever is in this loop circuit.

It should be noted that the position of the wiper arm 61 will determine the saw tooth rise time as will the size of the capacitors 56 and 57. The movement of the wiper arm 61 is indicated on its actuating dial 60 in terms of degrees and inches of displacement resolution in two ranges. One range, the larger one, is used when capacitor 56 is in the circuit. The smaller range, which is one-tenth that of the larger range, is used when capacitor 57 is switched into the loop circuit by means of switch 58. Since the capacitor 56 or 57 selected by the switch arm 58 is connected from plate to cathode of the dumper tube 54, conduction of the dumper tube, as will occur whenever a positive-going pulse is received on the grid of the dumper tube, will in effect short out the capacitor and reduce to zero the voltage which may have been developed across it. In other words, the linear saw tooth wave form which is developed across the selected capacitor 56 or 57 is terminated by a pulse causing conduction of the dumper tube 54 and its voltage level reduced to zero so that on termination of the conduction of the dumper tube 54 the saw tooth voltage will again develop across the selected capacitor 56 or 57 from its zero reference base.

As has previously been noted, the saw tooth wave form developed across the dumper tube 54 is applied to the grid of the cathode follower stage 50. The output of that stage is fed to a contact 67 of a selector pole 68 of the switch 28. On the voltage resolution position of the switch 28 contact 69 of the selector pole 68 and contact 71 of the selector pole 48 are connected together by a conductor 72, thus by-passing the signal across the amplifier stage 51, the coincidence dumper stage 54 and the cathode follower stage 50.

Figure 3:
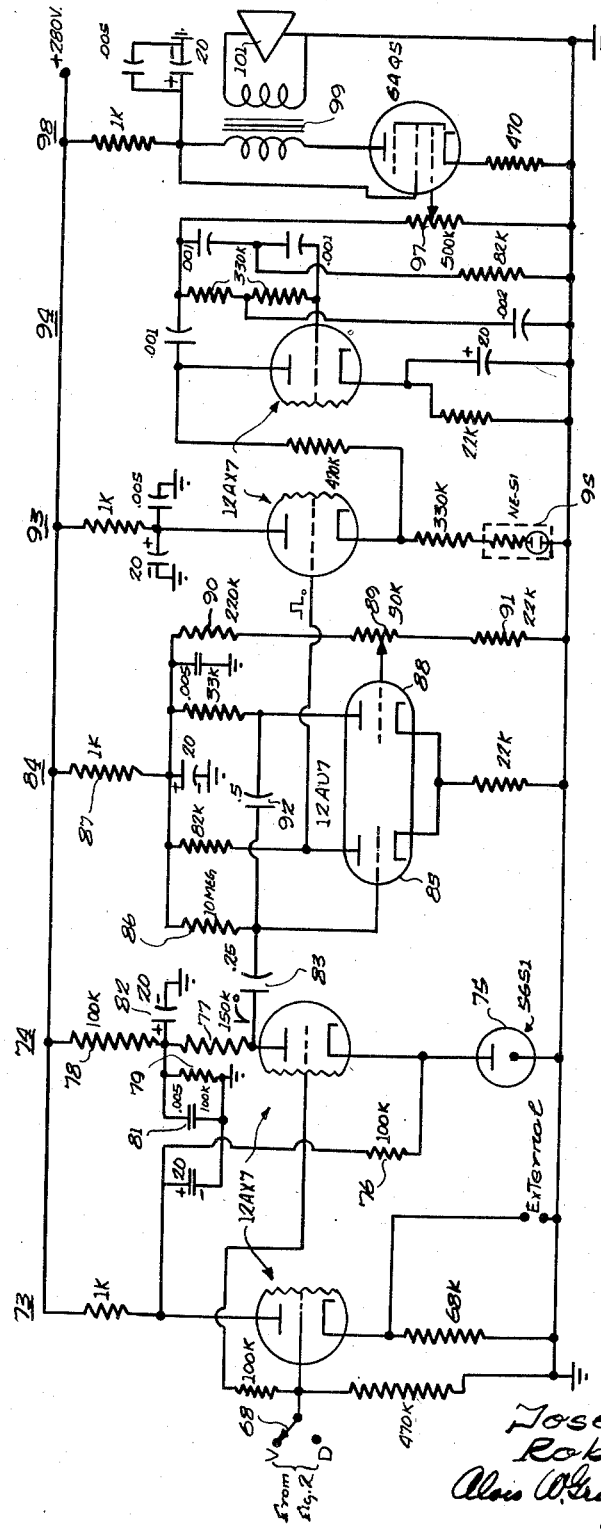
Figure 3 is a schematic diagram of that portion of the wiring which is nearest the output and is common to the testing for both resolution characteristics.

Referring now to Figures 1 and 3 for a further description of this device, selector pole 68 is connected to the control grid of a cathode follower stage 73 and a gate 74. The output of the cathode follower stage 73 may be used as the low impedance input to an oscilloscope or a recorder. Its plate circuit is appropriately decoupled to B plus as described in connection with previous stages. The cathode of the gate stage 74 is held at a fixed voltage above ground by a voltage reference tube 75, as is well known in the art. A bleeder resistor 76 is connected from the plate of the regulator tube 75 through the plate decoupling resistor of the cathode follower stage 73 to B+ and provides sufficient current through the neon tube 75 to cause its current variations to be about the optimum operating point as used in connection with the gate 74. The plate voltage for gate 74 is applied to its load resistor 77 from a tap between a voltage divider consisting of the series connected resistors 78 and 79 connected between B+ and ground. The capacitors 81 and 82, together with the resistors 78 and 79, provide decoupling for the gate to B+. Whenever the input voltage to the gate 74 goes positive with respect to the tube cut-off point as determined by the tube characteristics and the voltage at the reference stabilized cathode, a negative-going output pulse is coupled from the plate of the gate 74 through a capacitor 83 to the grid of a left hand section 85, as shown in Figure 3, of a one-shot multivibrator stage 84, which is of standard design and its operation will therefore be only briefly described.

The left hand side 85 of the multivibrator has its grid returned through a resistor 86 and a small decoupling resistor 87 to B+. The grid voltage of the right hand side 88 of the multivibrator has its voltage adjusted by means of a potentiometer 89 which is in the voltage divider chain consisting of the resistors 87, 90, 89 and 91 from B+ to ground, so as to maintain this side 88 below cut-off when the left hand side 85 is normally conducting. A negative-going pulse appearing on the grid of the tube side 85 will drive this side temporarily to cut-off and cause the side 88 to conduct. A capacitor 92 between the plate of the right tube side 88 and the grid of the left tube side 85 drives that left tube side 85 further negative and holds it there for a time primarily determined by the RC time of the resistor 86 and the capacitor 92. The output is taken from the left hand plate of multivibrator 84 which is a positive-going square wave pulse and connected to the grid of a triode 93 which serves in effect to gate the plate voltage to a tone oscillator 94 and also permits sufficient current to flow through a neon bulb 95 connected in the cathode of the triode stage 93 to light that neon bulb whenever the triode 93 is driven to a high state of conduction which is equivalent to reducing its plate resistance during the period that the positive-going square wave output pulse from the one-shot multivibrator 84 appears at its grid input. The tone oscillator 94 is a standard phase shift oscillator which provides sufficient in-phase feedback between the plate and the grid by an appropriate phase-shifting network. For a detailed description of this oscillator, reference is had to Figures 4–15 on page 195 and accompanying description in vol. 19 on Wave Forms of the Massachusetts Institute of Technology Radiation Laboratory Series. The output of the tone oscillator is taken from a potentiometer 97 and applied to the grid of a power amplifier stage 98 having an output transformer 99 to drive a speaker 101 in its plate circuit. The loudspeaker 101 and the neon tube 95 provide, respectively, the aural and visual outputs for the resolution tester.

Referring to Figure 1 for the operation of the resolution tester, it should be noted that the two positions of the selector switch 28 provide in one position an indication of unsatisfactory voltage resolution of the potentiometer 10 under test while providing in its other position an indication of the unsatisfactory displacement resolution of the potentiometer 10 under test. Going first into the operation of the resolution tester, with the selector switch 28 in its displacement resolution position, the dial 60 varying the rise time of the saw tooth generator 55A is first set to the desired permissible displacement resolution in degrees or inches, respectively. The potentiometer 10 on this test has applied across its resistance winding from the main regulated power supply 11 through the calibration resistor 12 a selected excitation voltage. The step voltage function picked up by the wiper 14 as it is moved by the constant speed motor 13 along the potentiometer winding is passed through the differentiator capacitor 16, resistor 17 providing a differentiated positive-going pulse. These pulses are amplified in amplifiers 15 and 23 and then passed to the clipper-amplifier 31. The clipper-amplifier 31 will both base clip and then peak clip the pulses, producing at its output constant amplitude negative-going pulses which are fed to the amplifier 42 for further amplification. The output of the amplifier 42 is fed to the amplifier 51 for inversion and further amplification. The positive-going pulses from the output of the amplifier 51 are passed to the grid of the dumper tube 54 which is normally maintained below cut-off. The pulses are of sufficient amplitude to drive the dumper tube 54 from cut-off to saturation. When saturated the tube shorts out the timing capacitors 56 and 57 (see Figure 2), and the saw-tooth wave, which was then developing across the capacitor 56 or 57, is literally dumped so that when the dumper is again cut-off by the absence of a positive going pulse at the output of the amplifier 51, the capacitor recharges at a linear rate from its zero reference base until it is again discharged by the next positive-going output pulse from amplifier 51 which is a result of the next step voltage having been picked off from the potentiometer winding 10 by the wiper 14. This procedure produces a saw tooth wave form, the rise time of which is determined by the setting of the dial 60, but the voltage to which it may rise is determined by the spacing between adjacent turns of the potentiometer winding 10. The saw tooth output of the coincidence dumper 54 is fed through a cathode follower stage 50 to the gate 74 and the cathode follower 73. As previously mentioned, the cathode follower 73 provides the input to external permanent recorders or an oscilloscope. The gate 74 is accurately biased at a fixed reference voltage with respect to ground, and starts to conduct whenever the positive-going saw tooth voltage appearing at its grid raises the grid to cathode voltage above the cut-off voltage of the tube. At that time, the gate 74 conducts and provides a negative-going output pulse to the one-shot multivibrator 84. The one-shot multivibrator 84 is actuated by the incoming pulse and causes a positive-going square pulse which is applied to a triode voltage gating tube 93 whose plate resistance is decreased to permit current to flow through it with relatively little voltage drop through the tube. As a result, the neon indicator which is connected to the cathode circuit of the triode gating tube 93 is lighted indicating that the saw tooth wave form appearing at the input of the gate 74 has risen to a voltage which exceeds the voltage equivalent to the minimum permissible displacement resolution and indicates that the spacing between two adjacent turns of the potentiometer winding being tested has exceeded a certain maximum set into the dial 60 in degrees or, in other words, that the angular resolution between two adjacent turns of the potentiometer winding 10 is below that permitted by the specification as set up on the dial 60. When actuated by the positive-going square wave output from the one-shot multivibrator 84, voltage gating tube 93 permits sufficient plate voltage to be applied to the tone oscillator 94 to cause it to oscillate. The output of tone oscillator 94 is in turn fed to a power amplifier 98 which drives a loud speaker 101 for an aural indication of the failure of the potentiometer to meet the specification as to angular resolution in degrees set into the dial 60.

With selector switch 28 set in its voltage resolution test position, the positive-going pulse output of amplifier 23 is now applied directly to the input of amplifier 42 and the positive-going output pulse of amplifier 42 is applied to the gate 74 which will now be actuated whenever the positive-going pulse appearing at its input exceeds a certain permissible maximum which is determined by the initial adjustment of calibration resistor 12. If the voltage change between two adjacent points on the potentiometer winding being tested is more than a permissible amount, as determined by the initial voltage adjustment across the potentiometer by means of calibration resistor 12, then that voltage change is large enough to actuate the gate 74 and provides an aural indication as previously discussed in connection with the operation of the device as a displacement resolution tester.

While there has been shown and described an invention in connection with certain specific embodiments, it will, of course, be understood that it is not intended nor wished to be limited thereto, since it is apparent that the principles herein disclosed are susceptible of numerous other applications, and modifications may be made in the circuit arrangements and in the instrumentalities employed without departing from the spirit and scope of this invention as set forth in the appended claims.

We claim:

1. A combination voltage and displacement resolution tester for wound resistance elements comprising a source of voltage applied across said wound resistance element in series with a calibration means, a reversible driving means for positioning a slidable means along the turns of said resistance element, a differentiator connected to said slidable means, a first amplifier having its input connected to said differentiator, a second amplifier having its input connected to the output of said first amplifier, a five pole double-throw switch means having a first selector pole connected to the output of said second amplifier, a clipper-amplifier having its input connected to the first position of said one selector pole and its output connected to the first position of a second selector pole of said switch means, a first lead connecting said second positions of said two selector poles, a third amplifier having its input connected to said second selector pole and its output connected to a third selector pole of said switch means, a fourth amplifier having its input connected to the first position of said third selector pole and its output connected to a coincidence dumper, a variable rise time saw tooth generator calibrated in units of displacement resolution connected to said coincidence dumper producing a saw tooth voltage at the output of said coincidence dumper which is terminated by an input from said fourth amplifier, said coincidence dumper output being connected to the input of a cathode follower, the output of said cathode follower being connected to the first position of a fourth selector pole, a second lead connecting the second positions of said third and fourth selector poles, said fourth selector pole being connected to the input of a gate and to the input of a second cathode follower, the output of said second cathode follower being connected to drive a wave form indicating device, said gate having its output connected to actuate a one-shot multivibrator, a fifth selector pole connecting in its second position a filter capacitor across said wound resistance element, the output of said multivibrator actuating a visual indicator and an audible device, said switch means in its first position causing said visual indicator and said audible device to be actuated whenever the displacement resolution of any two adjacent turns of said resistance element exceeds the specified permissible value set into said variable rise time saw tooth generator, said switch means in its second position causing said visual indicator and said audible device to be actuated whenever the voltage resolution of any two adjacent turns of said resistance element exceeds a maximum voltage change per step which maximum permissible change has been set by adjusting the voltage across said resistance element by varying said calibration means.

2. A combination voltage and displacement resolution tester for wound resistance elements comprising a source of voltage applied across said wound resistance element, calibration means for varying said voltage applied across said resistance element, a reversible driving means for positioning a slider along the turns of said resistance element, circuit means including a gating circuit providing an output pulse when the displacement resolution of any two adjacent turns of said resistance element exceeds its tolerance, adjustment means including a variable rise time saw tooth generator for varying the permissible displacement resolution at which said circuit means provide an output pulse, switch means for modifying said circuit means to provide an output pulse whenever the voltage resolution of any two adjacent turns of said resistance element exceeds a maximum permissible voltage change per step between adjacent turns as appearing on said slider, said calibration means being set for the maximum permissible voltage change per step, said output pulses actuating an indicator, said switch means in a first position causing said indicator to be actuated whenever the displacement resolution of any two adjacent turns of said resistance element exceeds the tolerable value set into said variable rise time saw tooth generator, said switch means in a second position causing said indicator to be actuated whenever the voltage resolution of any two adjacent turns of said resistance element exceeds a maximum voltage change per step which maximum permissible change has been set by adjusting the voltage across said resistance element by varying said calibration means.

3. A combination voltage and displacement resolution tester for wound resistance elements comprising a source of voltage applied across said wound resistance element, calibration means for varying said voltage applied across said resistance element, a reversible driving means for positioning a slider along the turns of said resistance element, circuit means providing an output pulse when the displacement resolution of any two adjacent turns of said resistance element is below a permissible minimum, adjustment means for varying the permissible maximum displacement resolution at which said circuit means provide an output pulse, two-position switch means for modifying said circuit means to provide an output pulse whenever the voltage resolution of any two adjacent turns of said resistance element exceeds a maximum permissible voltage change per step between adjacent turns as appearing on said slider, said calibration means being set for the maximum permissible voltage change per step, said output pulses actuating an indicator, said switch means in its first position causing said indicator to be actuated whenever the displacement resolution of any two adjacent turns of said resistance element exceeds the tolerable value set into said adjustment means, said switch means in its second position causing said indicator to be actuated whenever the voltage resolution of any two adjacent turns of said resistance element exceeds a maximum voltage change per step which maximum permissible change has been set by adjusting the voltage across said resistance element by varying said calibration means.

4. A combination voltage and displacement resolution tester for wound resistance elements comprising a source of voltage applied across said wound resistance element, calibration means for varying said voltage applied across said resistance element, pickup means for picking up the voltage appearing on the several turns of said resistance element, circuit means providing an output when the displacement resolution of any two adjacent turns of said resistance element exceeds a permissible minimum, adjustment means for varying the permissible maximum displacement resolution at which said circuit means provide an output, switch means for modifying said circuit means to provide an output whenever the voltage resolution of any two adjacent turns of said resistance element exceeds a maximum permissible voltage change per step between adjacent turns as appearing on said pickup means, said calibration means being set for the maximum permissible voltage change per step, said output actuating an indicator, said switch means in a first position causing said indicator to be actuated whenever the displacement resolution of any two adjacent turns of said resistance element exceeds the tolerable value set into said adjustment means, said switch means in a second position causing said indicator to be actuated whenever the voltage resolution of any two adjacent turns of said resistance element exceeds a maximum voltage change per step which maximum permissible change has been set by adjusting the voltage across said resistance element by varying said calibration means.

5. A combination voltage and displacement resolution tester for wound resistance elements comprising a source of voltage applied across said wound resistance element, pickup means for picking up the voltage appearing on the several turns of said resistance element, circuit means providing an output when the displacement resolution of any two adjacent turns of said resistance element exceeds a permissible minimum, adjustment means for varying the permissible maximum displacement resolution at which said circuit means provide an output, switch means for modifying said circuit means to provide an output whenever the voltage resolution of any two adjacent turns of said resistance element exceeds a maximum permissible voltage change per step between adjacent turns as appearing on said pickup means, calibration means for setting the maximum permissible voltage change per step, said output actuating an indicator, said switch means in a first position causing said indicator to be actuated whenever the displacement resolution of any two adjacent turns of said resistance element exceeds the tolerable value set into said adjustment means, said switch means in a second position causing said indicator to be actuated whenever the voltage resolution of any two adjacent turns of said resistance element exceeds a maximum voltage change per step which maximum permissible change has been set by adjusting said calibration means.

6. A voltage resolution tester for wound resistance elements comprising a source of voltage applied across said wound resistance element, pickup means for picking up the voltage appearing on the several turns of said resistance element, circuit means including a gating circuit providing an output pulse whenever the voltage resolution of any two or more adjacent turns of said resistance element exceeds a maximum permissible voltage change between adjacent turns as appearing on said pickup means, calibration means for setting the maximum permissible voltage change, said output pulse actuating an indicator whenever the voltage resolution of any two adjacent turns of said resistance element exceeds a maximum voltage change which maximum permissible change has been set by adjusting said calibration means.

7. A displacement resolution tester for wound resistance elements comprising a source of voltage applied across said wound resistance element, pickup means for picking up the voltage appearing on the several turns of said resistance element, circuit means including a gating circuit providing an output pulse when the displacement resolution of any two adjacent turns of said resistance element exceeds a permissible value, adjustment means including a variable rise time saw tooth generator for varying the permissible displacement resolution at which said circuit means provide an output pulse, said output actuating an indicator whenever the displacement resolution of any two adjacent turns of said resistance element exceeds the value set into said adjustment means.

8. A voltage resolution tester for variable resistors having a wound resistance element and a translatable member in slidable contact therewith comprising a source of voltage adapted to be connected across the resistance element, means for adjusting the potential applied across the resistance element by said source to a fixed multiple of the number of turns on said resistance element, and indicating means adapted to be coupled to the translatable member responsive to step changes in the potential of the translatable member greater than the value of the fixed multiple.

9. A voltage resolution tester for variable resistors comprising the elements of claim 8 wherein the indicating means includes means to differentiate a signal applied to the translatable member, and a gate connected to the differentiating means, whereby any pulse appearing in the output of the gate indicates an excessive potential difference between turns on the resistor under test.

10. A displacement resolution tester for variable resistors having a wound resistance element and a translatable member in slidable contact therewith comprising a source of voltage adapted to be connected across the resistance element, means to translate the slidable contact across the resistance element at a constant rate, means adapted to be coupled to the slidable element of the variable resistor to differentiate the signal appearing thereon, and means to compare the time duration of each pulse produced by the differentiating means against a standard.

11. A displacement resolution tester comprising the elements of claim 10 wherein the means to compare the time duration of each pulse produced by the differentiation means against a standard comprises a coincidence dumper connected to the output of the differentiation means, a capacitor connected across the coincidence dumper, and a source of voltage connected across the capacitor in series with an impedance, whereby the coincidence dumper discharges the capacitor for each pulse generated in the differentiation means and the magnitude of the potential developed across the capacitor between discharges is a measurement of the distance between adjacent turns on the resistor under test.

12. A displacement resolution tester for variable resistors comprising the elements of claim 10 wherein the means to compare the time duration of each pulse produced by the differentiation means against a standard comprises a coincidence dumper having a vacuum tube with a plate, control grid, and cathode, the control grid of said vacuum tube being applied to the differentiating means, a capacitor connected between the plate and cathode of said vacuum tube, a source of power connected through an impedance between the plate and cathode of said vacuum tube, a gate coupled to the plate of said vacuum tube conducting pulses above a threshold valve, and means to indicate pulses conducted by the gate coupled to the gate, the vacuum tube saturating and shorting the capacitor for each pulse from the differentiating means to discharge the capacitor, whereby pulses developed across the capacitor of sufficient magnitude to trigger the gate and produce an indication on the indicating means represent excessive spacings between adjacent turns of the resistor under test.

References Cited in the file of this patent

UNITED STATES PATENTS 2,715,208     Hayes _____ Aug. 9, 1955